United States Patent [19]

Kardos

[11] Patent Number: 4,951,706

[45] Date of Patent: Aug. 28, 1990

[54] FLAPPER CHECK VALVE

[75] Inventor: Peter Kardos, Longmeadow, Mass.

[73] Assignee: Fulton Thermatec Corporation, Pulaski, N.Y.

[21] Appl. No.: 359,082

[22] Filed: May 26, 1989

[51] Int. Cl.⁵ .................. F16K 15/10; F23C 11/00
[52] U.S. Cl. ..................... 137/512.1; 137/516.13; 137/516.23; 431/1
[58] Field of Search ........... 137/512.1, 516.13, 516.17, 137/516.21, 516.23; 431/1; 60/39.77, 39.8

[56] References Cited

U.S. PATENT DOCUMENTS

| | | | |
|---|---|---|---|
| 1,102,647 | 7/1914 | Davis | 137/625.33 X |
| 1,121,969 | 12/1914 | Beling | 137/512 |
| 1,243,122 | 10/1917 | Winters | 137/625.33 X |
| 1,909,974 | 5/1933 | Longacre | 137/516.21 X |
| 2,898,978 | 8/1959 | Kitchen et al. | 60/39.77 X |
| 3,005,485 | 10/1961 | Salgo et al. | 60/39.77 X |
| 3,162,699 | 12/1964 | Sivyer | 137/512.1 X |
| 3,312,241 | 4/1967 | Bryant | 137/599 |
| 3,357,449 | 12/1967 | King | 137/512.1 |
| 3,358,710 | 12/1967 | Page | 137/516.21 X |
| 3,536,094 | 10/1970 | Manley, Jr. | 137/512.1 |
| 3,786,834 | 1/1974 | Garland | 137/516.15 X |
| 3,853,268 | 12/1974 | Schneider | 137/625.33 |
| 4,173,985 | 11/1979 | Kirpichenkov | 137/512.1 |
| 4,278,106 | 7/1981 | Cunningham | 137/512.1 |
| 4,300,595 | 11/1981 | Mayer et al. | 137/625.33 |
| 4,307,751 | 12/1981 | Mayer et al. | 137/512.1 |
| 4,336,791 | 6/1982 | Kitchen | 431/1 X |
| 4,483,363 | 11/1984 | Madoche et al. | 137/512.1 X |
| 4,537,213 | 8/1985 | Molina | 137/269.5 |
| 4,569,208 | 2/1986 | Villa | 137/855 |
| 4,570,610 | 2/1986 | Himmel | 431/1 X |
| 4,577,661 | 3/1986 | Melrose et al. | 137/625.33 |
| 4,640,674 | 2/1987 | Kitchen | 431/1 |
| 4,643,226 | 2/1987 | Balz | 137/625.33 |
| 4,687,435 | 8/1987 | Matsuzaka et al. | 137/516.15 X |
| 4,715,807 | 12/1987 | Yokoyama et al. | 431/1 X |
| 4,752,209 | 6/1988 | Vishwanath et al. | 431/1 |

FOREIGN PATENT DOCUMENTS

0009416  1/1984  Japan ...................... 431/1

Primary Examiner—John Rivell
Attorney, Agent, or Firm—Douglas H. Pauley; Thomas W. Speckman

[57] ABSTRACT

This invention relates to a flapper check valve having a valve housing which has at least one outlet opening. A valve backer plate having a plurality of arcuate backer through holes is positioned generally parallel to a valve port plate having a plurality of arcuate port through holes. The valve port plate and valve backer plate are sealably secured with respect to the valve housing. In an open position of the flapper check valve, the backer through holes are in communication with the port through holes. At least one peripheral spacer/hermetic seal is positioned at a generally peripheral location relative to the valve port plate. Upon combustion within the combustion chamber, the flapper check valve prevents fluid/gas backflow in a direction from the valve backer plate to the valve port plate. At least one flat central spacer is positioned at a generally central location relative to the valve port plate and the valve backer plate. A plurality of inner spacer/guide pins are positioned on an interior surface of the valve port plate. The inner spacer/guide pins provide sufficient support to the valve backer plate whereby the valve backer plate can have a reduced thickness and still resist deflection when the valve backer plate is subjected to relatively high pressures from within the valve housing during a combustion cycle within the combustion chamber.

16 Claims, 5 Drawing Sheets

FLAPPER CHECK VALVE

BACKGROUND OF THE INVENTION

1. Field of the Invention

This invention relates to a flapper check valve having a valve backer plate with a plurality of arcuate backer through holes, a valve port plate with a plurality of arcuate port through holes, and a flapper ring freely moveable between the plates for opening and closing communication between the backer through holes and the port through holes.

2. Description of the Prior Art

Existing flapper valves normally include a valve or port plate, a backer plate, an appropriate spacer, and flappers made of lightweight, flexible, abrasionresistant material such as fiberglass coated with TEFLON TM or another similar substance. Port plates normally have a plurality of circular through holes radially arranged such that a flapper ring can cover a radial row of the holes.

Each flapper ring is normally maintained in a predetermined position by pins which are inserted into the port plate. The ring flappers have little inertia and thus are easily displaced between the port plate and the backer plate.

Existing flapper valves use a center spacer to fix a predetermined gap between the valve plate and the backer plate. Fluid/gas flow capacity through the valve is a function of the gap or distance between the plates, the cross-sectional area and peripheral shape of the port openings or holes, and the pressure differential of the oscillating gas stream.

Existing flapper valves use valve plates and backer plates each having a multiplicity of holes with each hole having a relatively small diameter. Such relatively small diameter holes must be drilled or machined to achieve the proper number of holes in the relatively thick plates. Upon combustion and thus increased pressure within a combustion chamber, the back pressure forces the flapper rings against the holes in the valve plate and thus prevents back flow through the valve plate.

Increased flow through a valve can be achieved by increasing the number of through holes in the plate or by increasing the size of the holes in the plate. Thus to achieve certain flowrates, the valve plate and backer plate must have a relatively large diameter in order to accommodate the required multiplicity of circular holes. For example, an 8-5/8" diameter valve port plate according to existing designs may have 4 radially spaced circular arrays of circular holes. Such arrangement results in approximately 160 or more circular holes having approximately a ¼" diameter. Obviously, fabricating such plates requires expensive drilling and/or other manufacturing methods. Such existing plates cannot be produced by stamping with a die tool because the plate is too thick and the circular holes are positioned too close together.

U.S. Pat. No. 4,752,209 discloses a pulse combustion burner feed valve for supplying air or fuel gas to a pulse combustion burner in response to oscillating burner pressures. The '209 patent teaches a backer plate having two circular arrays of backer plate openings which correspond in size and position with two circular arrays of circular valve openings in a valve plate. A central spacer is used to adjustably fix the distance between the plates. Upon assembly of the plates, the flappers are radially aligned with locator pins. The '209 patent teaches valve and backer plates constructed of ¼" thick steel plate.

U.S. Pat. No. 4,687,435 discloses a pulse combustor having a valve mechanism for controlling air supply to a chamber. A smooth, ring-shaped elastic member is fitted on the outer periphery of a spacer and protects contact portions from wear. A plurality of valve guards are arranged on a combustion chamber side of a base plate. Each valve guard is fixed through a spacer to the base plate by a supporting screw.

U.S. Pat. No. 4,640,674 teaches a pulse combustion apparatus having a valve retainer which is used below each of a series of openings in a valve plate. The valve retainer has a disc-shaped portion and a boss that projects outwardly to one side of the disc-shaped portion. The boss is secured to the valve plate with a rivet that extends through a central opening in the boss and through an opening at the center of a circular series of openings in the valve plate.

U.S. Pat. No. 4,715,807 discloses a pulse combustion device having an air inlet valve assembly. The air inlet valve assembly includes an annular valve plate formed with a plurality of circumferentially and equally spaced air ports. A plurality of circumferentially and equally spaced air inlet valve units are mounted on the valve plate, on a common circular path concentric with a gas passage. Each air inlet valve unit includes a circular backer plate having circular holes. A circular air flapper is moveable between the valve plate and the backer plate and is lifted off the air port when applied with negative pressure from the mixing chamber.

U.S. Pat. No. 4,570,610 teaches a pulse combustion burner for a cooking surface. The pulse combustion burner has a flapper air valve comprising an end wall secured to a housing, a flapper membrane and a backer plate. The '610 patent also discloses the valve connected to a mixer chamber through a pipe coupling seal welded to a mixer head at a port extending through the sidewall of the mixing head.

U.S. Pat. No. 4,336,791 teaches a pulse combustion apparatus having inner and outer perforated discs which are essentially identical and are provided with respective sets of circular openings. The inner and outer discs have a relatively large circular central opening surrounded by an annular series of relatively small openings. Each relatively small opening is surrounded by a series of intermediate sized openings.

SUMMARY OF THE INVENTION

It is an objective of this invention to provide a flapper check valve having a valve backer plate and a valve port plate designed to be manufactured using die tools, preferably a stamping or casting method known as "short run tooling."

It is another object of this invention to provide a flapper check valve having increased flow capacity per unit of surface area of the valve port plate and the valve backer plate.

It is another object of this invention to provide a flapper check valve having arcuate through holes in each of the valve backer plate and the valve port plate in lieu of circular through holes.

It is yet another object of this invention to provide a flapper check valve having a valve backer plate and valve port plate, each with a substantially reduced thickness of the plate.

It is still another object of this invention to provide a flapper check valve having a central spacer, a plurality of inner spacers and a peripheral spacer/hermetic seal between the valve backer plate and the valve port plate to increase support of the valve backer plate and thereby allow reduction of the thickness of the valve backer plate.

The above objects of this invention are achieved by having a flapper check valve with a valve housing which has at least one outlet opening. A valve backer plate having a plurality of arcuate backer through holes is positioned generally parallel to a valve port plate having a plurality of arcuate port through holes. The valve port plate is sealably secured with respect to the valve housing. In an open position of the flapper check valve, the backer through holes are in communication with the port through holes. Fluid, preferably gas, first flows through the port through holes and into a space defined by a gap between the valve backer plate and the valve port plate. The gas then flows from such space into the backer through holes and further into the chamber defined by the valve housing. The gas further flows through a conduit into another downstream chamber, preferably a combustion chamber.

At least one peripheral spacer/hermetic seal is positioned at a generally peripheral location relative to the valve port plate. Each peripheral spacer/hermetic seal has an upstream side that abuts the valve port plate and a downstream side that abuts the valve backer plate. The words "upstream" and "downstream" are relative to the normal flow through the valve in a direction from the valve port plate to the valve backer plate. Upon combustion within the combustion chamber, the flapper check valve prevents fluid/gas backflow in a direction from the valve backer plate to the valve port plate.

In one embodiment of this invention, at least one flat central spacer is positioned at a generally central location relative to the valve port plate and the valve backer plate. Each central spacer has uniform thickness and is secured between the valve backer plate and the valve port plate to maintain a fixed distance between the plates. Each flat central spacer has an upstream side abutting the valve port plate and a downstream side abutting the valve backer plate.

In another embodiment according to this invention, a plurality of inner spacer/guide pins are positioned on an interior surface of the valve port plate. The interior surface is inward relative to the general periphery of the valve port plate. The inner spacer/guide pins provide sufficient support to the valve backer plate whereby the valve backer plate can have a reduced thickness and still resist deflection when the valve backer plate is subjected to relatively high pressures from within the valve housing during a combustion cycle within the combustion chamber.

In another embodiment according to this invention, each inner spacer/guide pin comprises a rod having a central portion. The central portion has a cross-sectional area greater than the cross-sectional area of an outer portion located at each end of the rod. A transition from the central portion to each outer portion defines a shoulder that maintains a fixed distance between the valve port plate and the valve backer plate. The rod is secured relative to the valve port plate and the valve backer plate.

In a preferred embodiment of this invention, both the valve port plate and the valve backer plate have an overall circular shape. The valve port plate and the valve backer plate can have either the same dimensions or the valve backer plate can have a surface area less than that of the valve port plate. It is apparent that the overall shape of the valve port plate and the valve backer plate can also be a polyhedron, an oval, or any other suitable shape. Both plates preferably have similar overall shapes.

At least one flapper ring is freely moveable between the plates in a direction generally perpendicular to the valve port plate. The inner spacer/guide pins retain the flapper ring in a position such that upon a positive pressure within the valve housing, the flapper ring abuts the valve port plate and closes communication between the backer through holes and the port through holes. Each flapper ring abuts the valve port plate in such a position that the flapper ring overlaps a radial row of corresponding arcuate port through holes. Each flapper ring must have a uniform thickness. Each flapper ring has a ring width, defined as the distance between an outside ring radius and an inside ring radius, greater than the width of an arcuate hole, defined as the distance between an outside hole radius and an inside hole radius of a corresponding arcuate port through hole. Each flapper ring is guided by a plurality of inner spacer/guide pins.

In a preferred embodiment according to this invention, the backer through holes are sufficiently spaced within the valve backer plate and the port through holes are sufficiently spaced within the valve port plate so that each of the plates can be manufactured by stamping with a die tool.

The arcuate backer through holes are preferably radially offset relative to the arcuate port through holes. Thus, in an open position of the flapper check valve the flapper ring may abut the valve backer plate without overlapping the entire area of the backer through holes and thus maintain communication between the backer through holes and the port through holes. In a closed position of the flapper check valve, the flapper ring abuts the valve port plate and thus closes communication between the backer through holes and the port through holes.

In one embodiment according to this invention, the valve port plate is secured to the valve housing. The valve backer plate is secured downstream from the valve port plate and is also secured within the valve housing. The valve housing has at least one outlet opening that is in communication with a chamber, preferably a combustion chamber and/or a mixing chamber.

In another embodiment according to this invention, the valve housing has an internally threaded female coupling and the valve port plate is secured within an internal undercut of an externally threaded male coupling. The internally threaded female coupling is mateable with the externally threaded male coupling to form a sealed joint. The externally threaded male coupling may have external coupling flats for rotating the male coupling with the respect to the female coupling.

A concentric flapper check valve system according to this invention includes a fuel flapper check valve and an air flapper check valve. Each flapper check valve has a similar construction as described above. However, in a preferred embodiment, the fuel flapper check valve has a fuel valve housing wherein a fuel valve housing wall is sealably secured to an interior section of the air valve backer plate and the air valve port plate. An inner peripheral air spacer is secured between the air valve backer plate and the air valve port plate near the fuel valve housing wall. A flame trap is preferably secured within the fuel/air valve housing downstream with respect to the fuel valve backer plate and the air valve backer plate.

BRIEF DESCRIPTION OF THE DRAWINGS

The above mentioned and other features of this invention and the manner of obtaining them will become more apparent, and the invention itself will be best understood by reference to the following description of specific embodiments taken in conjunction with the drawings, wherein.

DESCRIPTION OF THE PREFERRED EMBODIMENTS

Typical pulse combustors have a mixer head which is in communication with a combustion chamber wherein a fuel/air mixture is combusted. The combustion chamber is in communication with an exhaust conduit for discharging combustion products. The mixer head delivers a combustible fuel/air mixture to the combustion chamber. Fuel, preferably in a gaseous form, is supplied to the mixer head through a fuel supply conduit. Such fuel is normally regulated by an in-line flapper check valve. Likewise, air is supplied to the mixer head through an air conduit. The air is normally metered by an in-line air flapper check valve.

This invention relates specifically to a flapper check valve that provides increased flow capacity through the valve. The increased flow capacity is relative to the unit surface area of through holes within the valve backer plate and the valve port plate. Existing flapper check valves typically have plates with a multiplicity of through holes having a circular cross section. To provide plates with a manageable size, such circular through holes are often positioned relatively close to one another and thus require precise machining to fabricate the plate. Accordingly, such fabrication results in an expensive end product. As discussed below, a flapper check valve including the plates, according to this invention, will result in reduced material and labor costs associated with manufacture of the valve, due to the flapper check valve having flappers and spacer/guide pins sandwiched between two valve plates.

Figure 1:
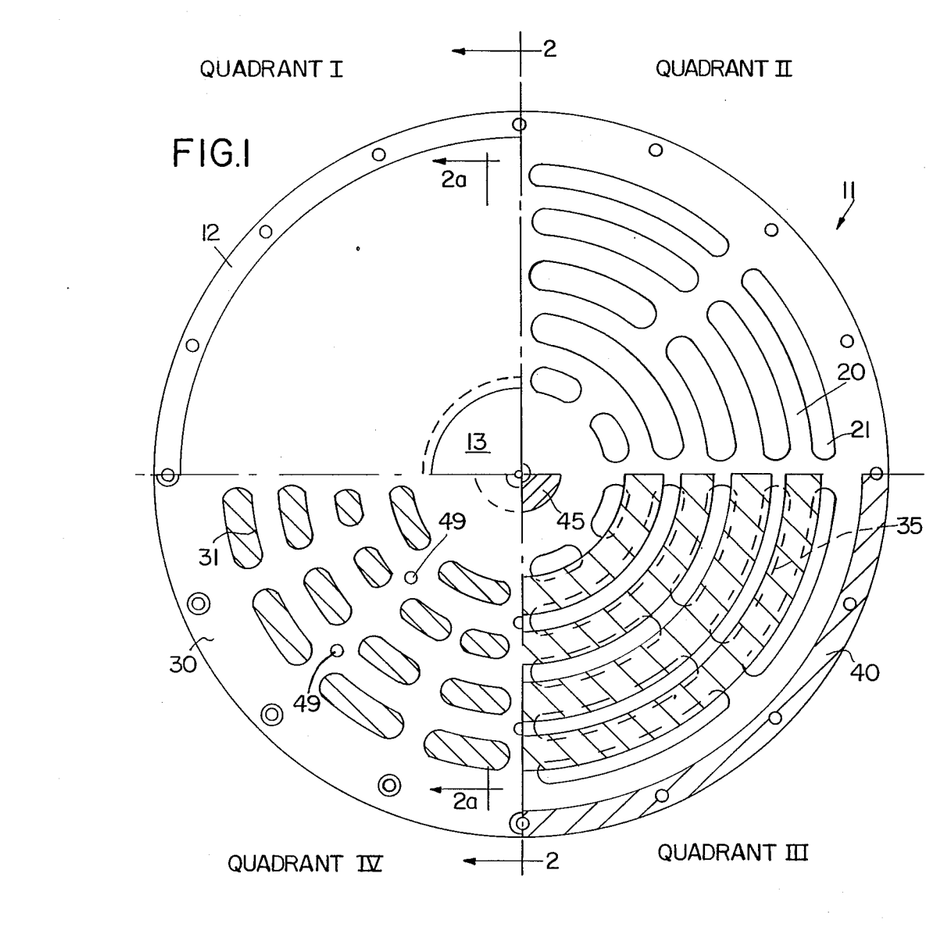
FIG. 1 shows a front view of a flapper check valve according to one embodiment of this invention, wherein the valve is divided into four quadrants to clearly show certain elements of the invention.
Figure 2:
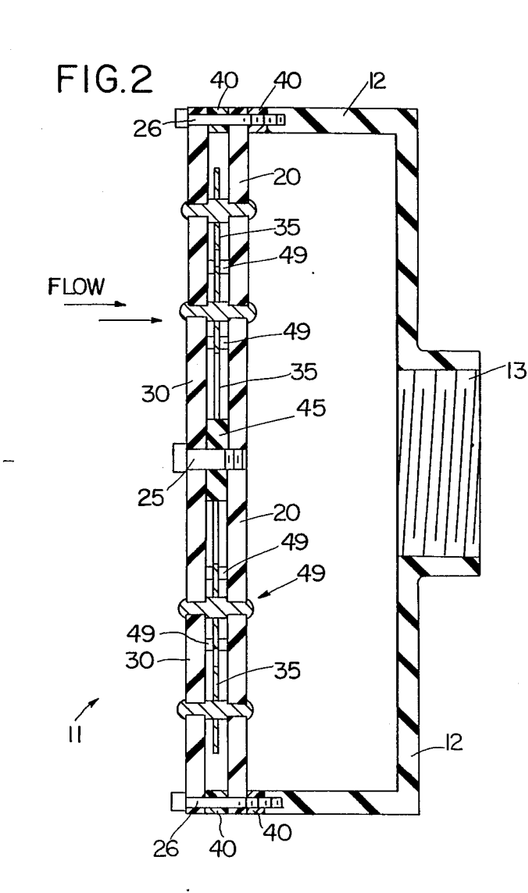
FIGS. 2 and 2a are cross-sectional views along lines 2—2 and 2a—2a, respectively, of a flapper check valve as shown in FIG. 1.
Figure 2A:
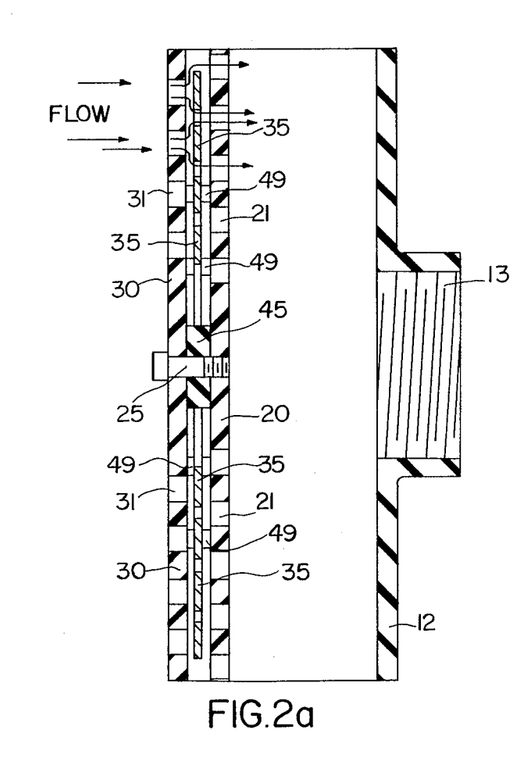

Referring to FIGS. 1, 2 and 2a, a flapper check valve according to this invention includes valve housing 12 having outlet opening 13 which is in communication with a downstream chamber, preferably a mixing chamber or a combustion chamber. Flapper check valve 11 has valve backer plate 20 and valve port plate 30. As used throughout this specification, the term "the plates" refers to both valve backer plate 20 and valve port plate 30. It is apparent that valve housing 12 can be modified to accommodate one or more flapper check valve assemblies each having one valve backer plate 20 and one valve port plate 30.

Valve backer plate 20 has a plurality of arcuate backer through holes 21, as shown in FIGS. 1, 2a, 3 and 4a. Valve port plate 30 has a plurality of arcuate port through holes 31, also as shown in FIGS. 1, 2a, 3 and 4a. FIGS. 2 and 4 do not show either backer through holes 21 or port through holes 31 since the respective cross sections are taken through the center of the valve, as shown by lines 2—2 and 4—4, respectively, in FIG. 1. Valve port plate 30 is positioned generally parallel to valve backer plate 20 and valve port plate 30 is sealably secured with respect to valve housing 12. In one embodiment, valve port plate 30 is secured with respect to valve housing 12 by a plurality of screws 26. It is apparent that valve port plate 30 can be secured with other suitable attachment means. In an open position of flapper check valve 11, backer through holes 21 are in communication with port through holes 31. It is apparent that the flow capacity of flapper check valve 11 increases as a number and/or size of backer through holes 21 and port through holes 31 increase.

Peripheral spacer/hermetic seal means are secured between the plates. The peripheral spacer/hermetic seal means are positioned about a general periphery of valve backer plate 20. It is apparent that the general periphery can be circular, polyhedral, or any other suitable shape.

In a preferred embodiment of this invention, the peripheral spacer/hermetic seal means comprise peripheral spacer/hermetic seal 40 positioned at a generally peripheral location relative to valve port plate 30. In one embodiment, peripheral spacer/hermetic seal 40 has an upstream side that abuts valve port plate 30 and a downstream side that abuts valve backer plate 20. In another embodiment, peripheral spacer/hermetic seal 40 has an upstream side that abuts valve backer plate 20 and a downstream side that abuts valve housing 12, as shown in FIG. 2. The terms "upstream" and "downstream" throughout this specification relate to the normal flow from valve port plate 30 to valve backer plate 20 when flapper check valve 11 is in an open position, as shown in FIGS. 2, 2a, 4 and 4a. It is apparent that peripheral spacer/hermetic seal 40 can be a one-piece spacer or can comprise a plurality of spacer pieces. The primary objective of peripheral spacer/hermetic seal 40 is to provide adequate peripheral support between the plates as well as to provide a hermetic seal between the plates.

Inner spacer/flapper guide means are secured between the plates. The inner spacer/flapper guide means and peripheral spacer/hermetic seal means maintain a fixed distance between the plates. Valve backer plate 20 is secured with respect to valve port plate 30, with the inner spacer/flapper guide means between the plates, with bolt 25 or by any other suitable securing means known in the art.

In a preferred embodiment according to this invention, the inner spacer/flapper guide means comprise at least one flat central spacer 45 positioned at a generally central location of the plates. Each central spacer 45 has a uniform thickness and has an upstream side that abuts valve port plate 30 and a downstream side that abuts valve backer plate 20.

In another embodiment according to this invention, inner spacer/flapper guide means comprise a plurality of inner spacer/guide pins 49 positioned on an interior surface of valve port plate 30. The interior surface is inward relative to the general periphery of valve port plate 30. Inner spacer/guide pins 49 provide sufficient support and stiffness to valve backer plate 20 and thus allow valve backer plate 20 and valve port plate 30 to have reduced thickness. Such support keeps valve backer plate 20 from deflecting when subjected to relatively high pressures from within valve housing 12, particulary during combustion within a pulse combustor.

Figures 6, 7:
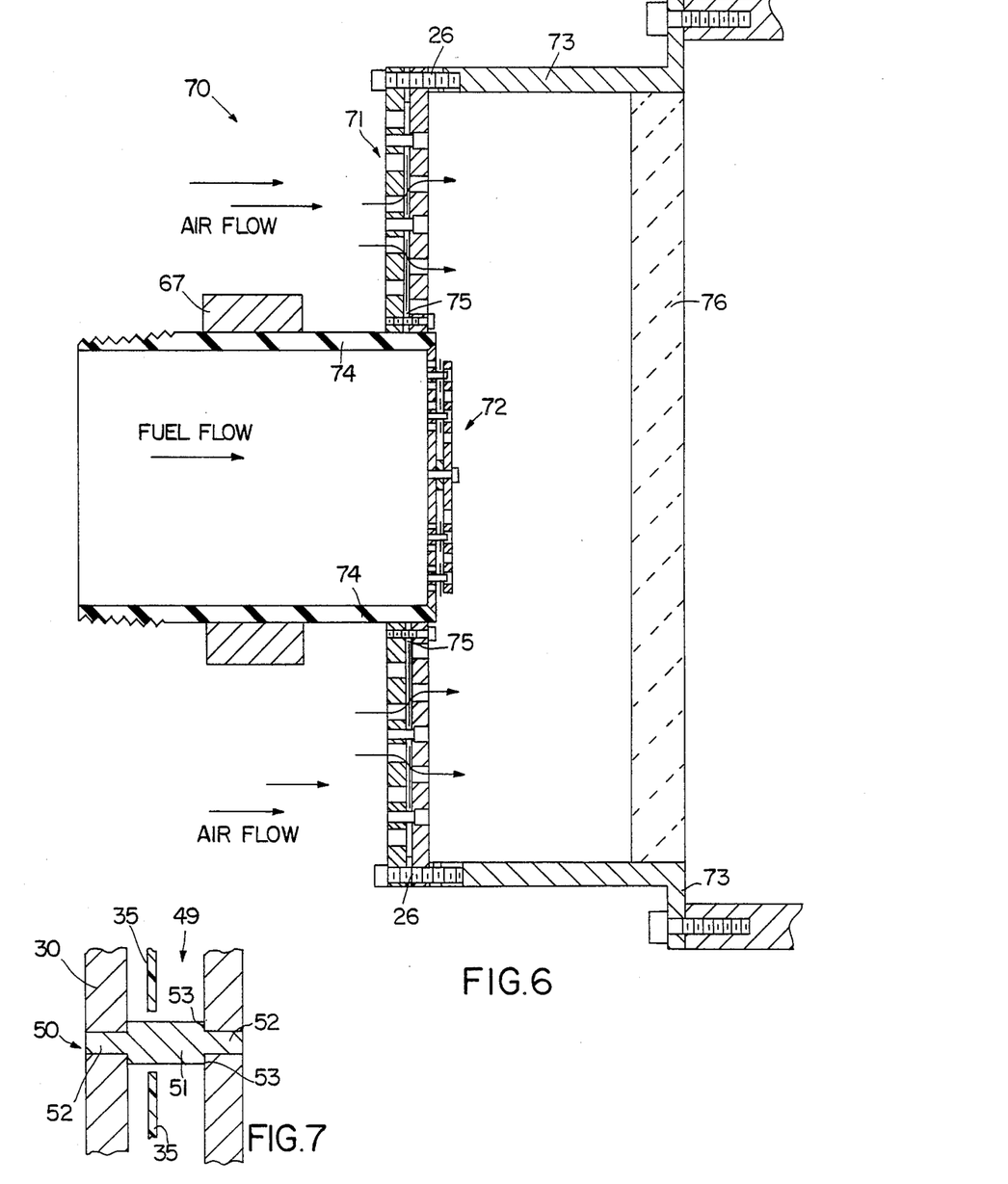
FIG. 6 shows a cross-sectional side view of a concentric flapper check valve system according to one embodiment of this invention.
FIG. 7 shows a cross-sectional side view of an internal spacer according to one embodiment of this invention.

In a preferred embodiment of this invention as shown in FIG. 7, each inner spacer/guide pin 40 comprises rod 50 having central portion 51. Central portion 51 has a cross-sectional area greater than the cross-sectional area of outer portion 52 at each end of rod 50. A transition from central portion 51 to each outer portion 52 defines a shoulder that maintains a fixed distance or gap between the plates. Rod 50 is secured relative to valve port plate 30 and valve backer plate 20. Rod 50 can be secured by being press fit within either of the plates, rod 50 can be secured by being an integral part of either of the plates, rod 50 can be secured with a rivet head as shown in FIG. 1, or rod 50 can be secured by any other suitable method. Securing rod 50 reduces vibration and operating noise. It is apparent that other suitable spacers familiar to the art can be used to both support valve backer plate 20 and to fix the distance between the plates.

Flapper means are freely moveable in a direction generally perpendicular to valve port plate 30. The flapper means move between the plates. Inner spacer/guide pins 49 retain the flapper means in a position such that upon a positive pressure within valve housing 12, the flapper means abut valve port plate 30 and thereby close communication between backer through holes 21 and port through holes 31. Backer through holes 21 allow back pressure upon combustion to force the flapper means against valve port plate 30.

In one embodiment of this invention, the flapper means comprise at least one flapper ring 35 secured between the plates. In such preferred embodiment, inner spacer/guide pins 49 retain each flapper ring in its respective concentric position. Each flapper ring 35 preferably has a uniform thickness. Flapper ring 35 has a ring width or ring distance, defined as the distance between an outside ring radius and an inside ring radius. The ring width or ring distance is greater than an arcuate distance, defined as the distance between an outside hole radius and an inside hole radius of a corresponding port through hole 31.

In a preferred embodiment of this invention, the plates each have an overall circular shape. It is apparent that the plates can have a polyhedral shape or any other suitable shape. In one embodiment of this invention, the plates have the same dimensions. In another embodiment, valve backer plate 20 has a smaller area than valve port plate 30 and valve backer plate 20 is mounted downstream from valve port plate 30; such embodiment is specifically shown in FIGS. 3, 4 and 4a.

An existing valve port plate and valve backer plate has been designed by Forbes Energy Engineering, Inc., and is shown in Forbes Energy Engineering, Inc. Drawing Numbers FE03-21B and FE03-22B. Such plates exemplify existing technology. A multiplicity of closely and radially adjacent circular holes, over 160, are drilled into the valve port plate. A combination of a multiplicity of circular through holes and arcuate through holes are closely spaced in the valve backer plate. Such existing design requires a relatively thick plate. Thus fabrication requires expensive and burdensome machining. Such existing plates cannot be produced by stamping with a die tool.

Contrary to the existing art, in a preferred embodiment of this invention, backer through holes 21 and port through holes 31 are sufficiently spaced within the respective plates to allow for fabrication by stamping with a die tool or other similar efficient tooling. Because flapper check valve 11 has peripheral spacer/hermetic seal means as well as inner spacer/flapper guide means, the thickness of the plates can be substantially reduced. For example, the thickness of the plate according to this invention is approximately ½ of the thickness of existing plates of other valves having similar flow capacities. The reduced thickness of the plate as well as increased spacing between arcuate backer through holes 21 and increased spacing between arcuate port through holes 31 allow for sufficient surface area of the plate to position and operate die tooling. In addition, the flow capacity of the valve remains constant since the arcuate through holes provide more area for flow than do the circular holes of the existing art. In order to achieve the capability of using die tooling with the existing plates, the diameter of the plate as well as the spacing between the circular through holes must be increased to maintain the same flow capacity of the valve.

In a preferred embodiment of this invention, backer through holes 21 are radially offset relative to port through holes 31 such that in an open position of flapper check valve 11, flapper ring 35 may abut valve backer plate 20 or float between the plates while maintaining communication between backer through holes 21 and port through holes 31. "Radially offset" as used in this specification relates to arcuate backer through holes 21 having offset radii with respect to adjacent rows or rings of arcuate port through holes 31. In a closed position of flapper check valve 11, flapper ring 35 abuts valve port plate 30 and forms a hermetic seal with respect to port through holes 31. Each flapper ring 35 abuts valve port plate in such a position that flapper ring 35 overlaps a radial row of port through holes 31. Thus in the closed position of flapper check valve 11, communication is closed between backer through holes 21 and port through holes 31.

Figure 3:
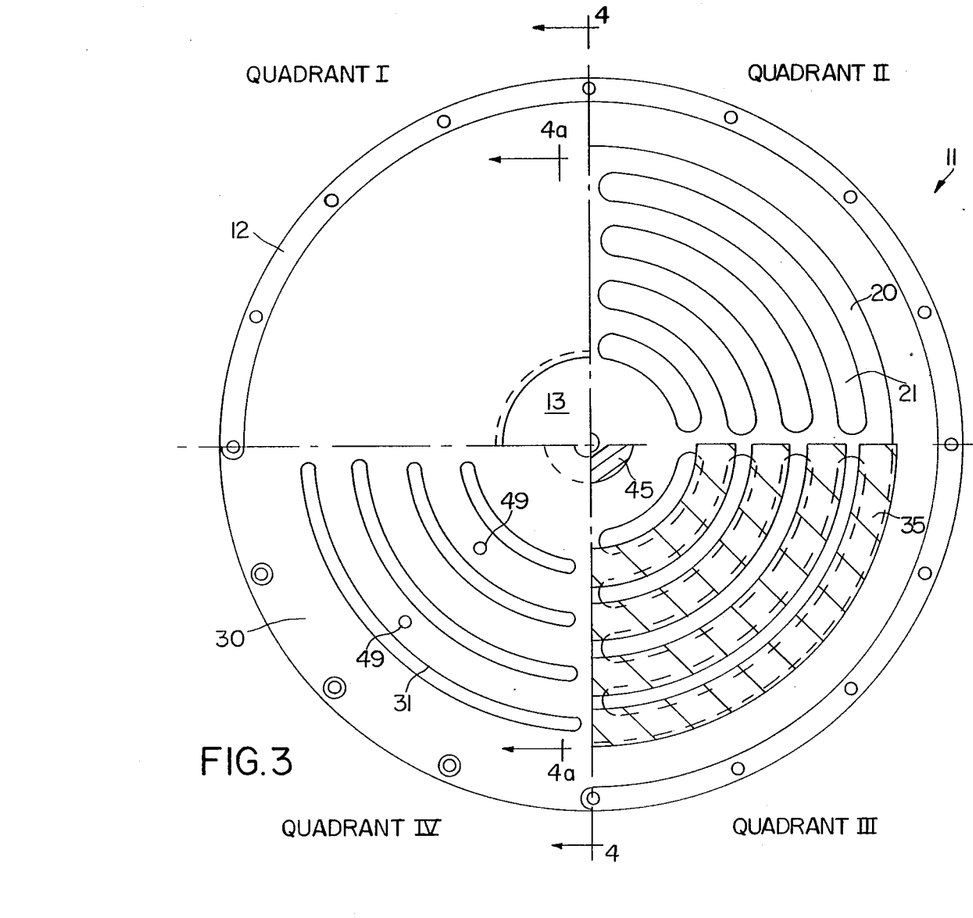
FIG. 3 shows a front view of a flapper check valve according to another embodiment of this invention, wherein the valve is divided into four quadrants to clearly show certain elements of the invention.
Figure 4:
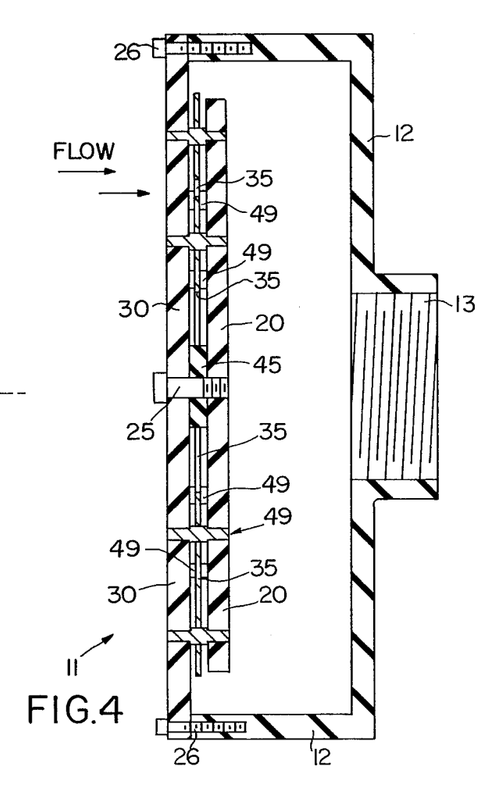
FIGS. 4 and 4a are cross-sectional views along lines 4—4 and 4a—4a, respectively, of a flapper check valve as shown in FIG. 3.
Figure 4A:
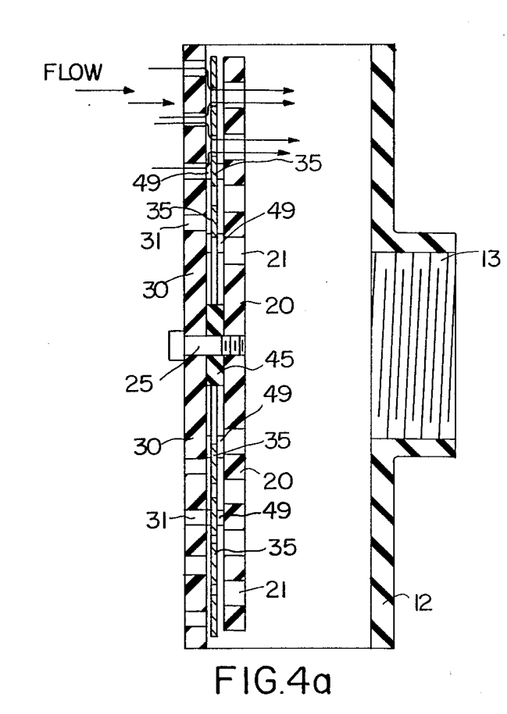

FIGS. 1 and 3 show a front view of two different embodiments of flapper check valve 11 wherein the valve is divided into four quadrants to clearly show elements of the invention. Quadrant I shows valve housing 12 and outlet opening 13. Quadrant II shows valve backer plate 20. Quadrant III shows flapper rings 35, peripheral spacer/hermetic seal 40 and central spacer 45; flapper rings 35 are shown with hatching and peripheral spacer/hermetic seal 40 and central spacer 45 are shown with crosshatching for the purpose of clearly distinguishing the elements. Quadrant IV shows valve port plate 30. FIGS. 2a and 4a illustrate backer through holes 21 and their radially offset position with respect to port through holes 31.

Figure 5:
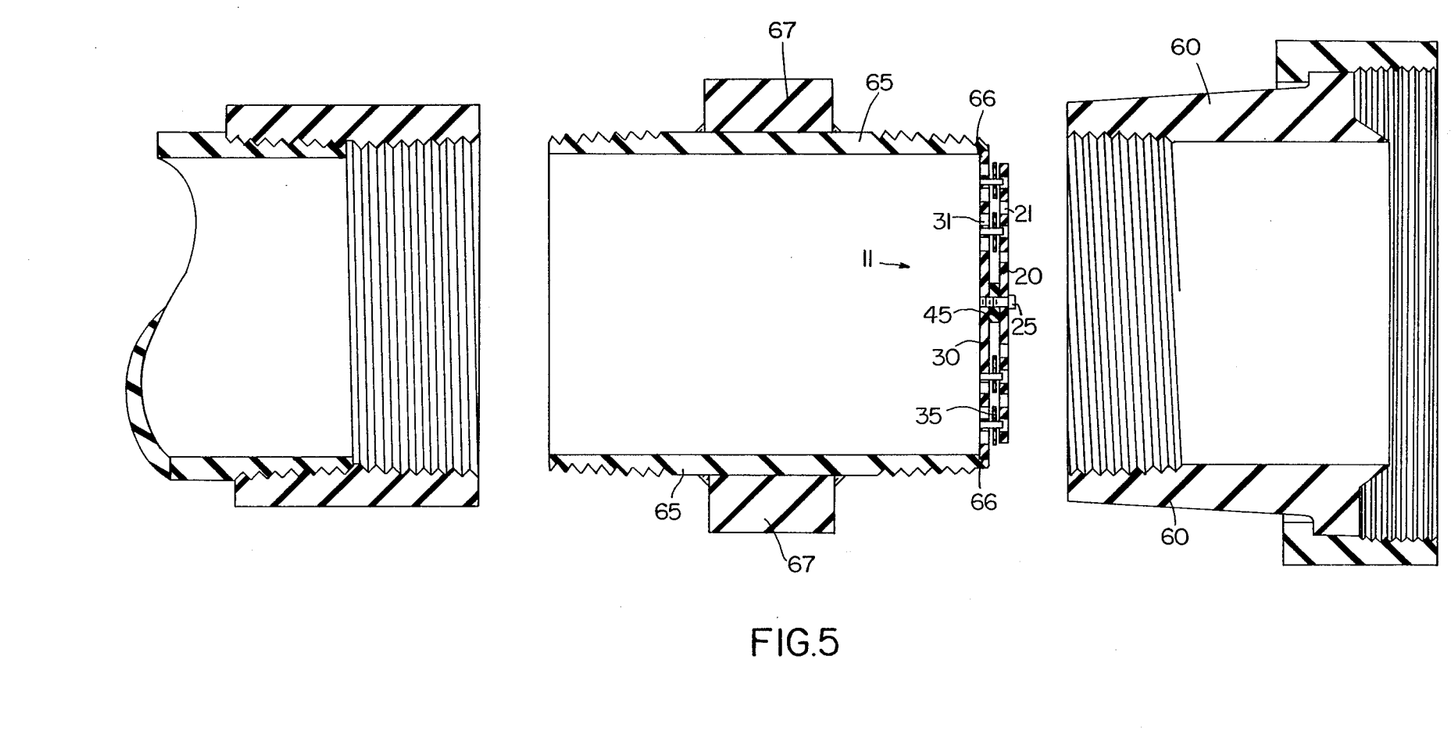
FIG. 5 shows an exploded view of a flapper check valve mounted to an externally threaded male coupling which mates with an internally threaded female coupling.

Referring to FIG. 5, in another embodiment of this invention, valve housing 12 has internally threaded female coupling 60. Valve port plate 30 is secured within internal undercut 66 of externally threaded male coupling 65. Female coupling 60 is mateable with male coupling 65 to form a sealed joint. Male coupling 65 may have external coupling flats 67 for rotating male coupling 65 with respect to female coupling 60.

FIG. 6 shows a cross-sectional side view of concentric flapper check valve system 70 which comprises fuel flapper check valve 72 and air flapper check valve 71. Fuel flapper check valve 72 has a similar construction to the above described flapper check valve 11. Air flapper check valve 71 also has a similar construction to flapper check valve 11 as described above, except that air flapper check valve 71 has an internal cutout section which accommodates fuel valve housing wall 74. Fuel valve housing wall 74 is sealably secured to an interior section of the plates of air flapper check valve 71. Inner peripheral air spacer 75 of air flapper check valve 71 is secured between the plates near fuel valve housing wall 74. In a preferred embodiment of this invention, concentric flapper check valve system 70 also has a flame trap 76 secured within fuel/air valve housing 73 downstream with respect to the plates. Flame trap 76 can be a ceramic porus plate, wound corrugated stainless steel, or any other suitable flame trap device which protects the flapper rings from high temperatures of flashback.

It is apparent that the elements of this invention can be made of suitable metals, fiberglass, and other materials known in the art. While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A flapper check valve comprising:
   a valve housing having outlet means;
   a valve backer plate having a plurality of arcuate backer through holes;
   a valve port plate having a plurality of arcuate port through holes, said valve port plate positioned generally parallel to said valve backer plate and sealably secured with respect to said valve housing, in an open position of the flapper check valve said backer through holes in communication with said port through holes;
   peripheral spacer/hermetic seal means secured between said valve backer plate and said valve port plate, said peripheral spacer/hermetic seal means positioned about a general periphery of said valve backer plate;
   inner spacer/flapper guide means secured between said valve backer plate and said valve port plate, said inner spacer/flapper guide means and said peripheral spacer/hermetic seal means maintaining a fixed distance between said valve port plate and said valve backer plate, said inner spacer/flapper guide means comprising a plurality of inner spacer/guide pins positioned on an interior surface, relative to said general periphery, of said valve port plate, and said inner spacer/guide pins providing sufficient support to said valve backer plate whereby said valve backer plate can have a reduced thickness and resist deflection when subjected to relatively high pressures from within said valve housing, each said inner spacer/guide pin further comprising a rod having a central portion with a central cross-section area greater than an outer cross-sectional area of an outer portion at each end of said rod, a transition from said central portion to each said outer portion defining a shoulder that maintains said fixed distance between said valve port plate and said valve backer plate, and said rod secured relative to said valve port plate and said valve backer plate; and
   flapper means freely moveable in a direction generally perpendicular to said valve port plate between said valve backer plate and said valve port plate, said inner spacer/flapper guide means retaining said flapper means in a position such that upon a positive pressure within said valve housing said flapper means abut said valve port plate and closes communication between said backer through holes and said port through holes.

2. A flapper check valve according to claim 1 wherein said inner spacer/flapper guide means further comprise at least one flat central spacer positioned at a generally central location of said valve port plate and said valve backer plate, each said central spacer has a uniform thickness, and said at least one flat central spacer has an upstream side that abuts said valve port plate and a downstream side that abuts said valve backer plate. valve backer plate, and said rod is secured relative to said valve port plate and said valve backer plate.

3. A flapper check valve according to claim 1 wherein said peripheral spacer/hermetic seal means further comprise at least one peripheral spacer/hermetic seal positioned at a generally peripheral location relative to said valve port plate and said at least one peripheral spacer/hermetic seal has an upstream side that abuts said valve port plate and a downstream side that abuts said valve backer plate.

4. A flapper check valve according to claim 1 wherein said valve port plate has an overall circular shape.

5. A flapper check valve according to claim 1 wherein said valve backer plate has an overall circular shape.

6. A flapper check valve according to claim 1 wherein said flapper means further comprise at least one flapper ring, each said flapper ring has uniform thickness and each said flapper ring has a ring distance between an outside ring radius and an inside ring radius greater than an arcuate distance between an outside hole radius and an inside hole radius of a corresponding said arcuate port through hole.

7. A flapper check valve according to claim 1 wherein said inner spacer/flapper guide means further comprise a plurality of inner spacer/guide pins positioned on an interior surface, relative to said general periphery, of said valve port plate, and each said flapper ring is guided by a plurality of said inner spacer/guide pins.

8. A flapper check valve according to claim 1 wherein said arcuate backer through holes are radially offset relative to said arcuate port through holes such that in an open position of the flapper check valve said flapper means may abut said valve backer plate while maintaining communication between said backer through holes and said port through holes, and in a closed position of the flapper check valve said flapper means abut said valve port plate closing communication between said backer through holes and said port through holes.

9. A flapper check valve according to claim 8 wherein said flapper means further comprise at least one ring flapper having a ring distance between an outside ring radius and an inside ring radius greater than an arcuate distance between an outside hole radius and an inside hole radius of a corresponding said arcuate port through hole.

10. A flapper check valve according to claim ·1 wherein said valve backer plate and said valve port plate have the same dimensions.

11. A flapper check valve according to claim 1 wherein said valve port plate is secured to said valve housing and said valve backer plate is secured downstream with respect to said valve port plate and is secured within said valve housing.

12. A flapper check valve according to claim 11 wherein said peripheral spacer/hermetic seal means further comprise at least one peripheral spacer/hermetic seal positioned at a generally peripheral location relative to said valve backer plate and said at least one peripheral spacer/hermetic seal has an upstream side that abuts said valve port plate and a downstream side that abuts said valve backer plate.

13. A flapper check valve according to claim 1 wherein said outlet means further comprise said valve housing having at least one outlet opening.

14. A flapper check valve according to claim 1 wherein said valve housing has an internally threaded female coupling, said valve port plate is secured within an internal undercut of an externally threaded male coupling, and said internally threaded female coupling is mateable with said externally threaded male coupling to form a sealed joint.

15. A concentric flapper check valve system comprising a fuel flapper check valve and an air flapper check valve, said fuel flapper check valve comprising:
a fuel valve housing;
a fuel valve backer plate having a plurality of arcuate fuel backer through holes;
a fuel valve port plate having a plurality of arcuate fuel port through holes, said fuel valve port plate positioned generally parallel to said fuel valve backer plate and sealably secured with respect to said fuel valve housing, in an open position of said fuel flapper check valve said fuel backer through holes in communication with said fuel port through holes;
peripheral fuel spacer means secured between said fuel valve backer plate and said fuel valve port plate, said peripheral fuel spacer means positioned about a general fuel valve periphery of said fuel valve backer plate;
inner fuel spacer means secured between said fuel valve backer plate and said fuel valve port plate, said inner fuel spacer means and said peripheral fuel spacer means maintaining a fixed first distance between said fuel valve port plate and said fuel valve backer plate;
fuel flapper means freely moveable in a first direction generally perpendicular to said fuel valve port plate between said fuel valve backer plate and said fuel valve port plate, said inner fuel spacer means retaining said fuel flapper means in a first position such that upon a positive pressure within said fuel-/air valve housing said fuel flapper means abut said fuel valve port plate and closes communication between said fuel backer through holes and said fuel port through holes;
said air flapper check valve comprising:
a fuel/air valve housing;
an air valve backer plate having a plurality of arcuate air valve through holes;
an air valve port plate having a plurality of arcuate air through holes, said air valve port plate positioned generally parallel to said air valve backer plate and sealably secured with respect to said fuel/air valve housing, in an open position of said air flapper check valve said air backer through holes in communication with said air port through holes;
outer peripheral air spacer means secured between said air valve backer plate and said air valve port plate, said peripheral air spacer means positioned about an air valve general periphery of said air valve backer plate;
inner peripheral air spacer means secured between said air valve backer plate and said air valve port plate, said air inner peripheral spacer means and said outer peripheral air spacer means maintaining a fixed second distance between said air port valve and said air valve backer plate, said inner peripheral air spacer means comprising an inner peripheral spacer secured between said air valve backer plate and said air valve port plate near said fuel valve housing wall;
air flapper means freely moveable in a second direction generally perpendicular to said air valve port plate between said air valve backer plate and said air valve port plate, said inner peripheral air spacer means retaining said air flapper means in a second position such that upon said positive pressure within said fuel/air valve housing said air flapper means abut said air valve port plate and closes communication between said air backer through holes and said air port through holes; and
said fuel valve housing having a fuel valve housing wall sealably secured to an interior section of said air valve backer plate and said air valve port plate.

16. A concentric flapper check valve according to claim 15 further comprising a flame trap secured within said fuel/air valve housing, said flame trap being downstream with respect to said fuel valve backer plate and said air valve backer plate.

* * * * *